US008893841B2

(12) United States Patent
Peotter

(10) Patent No.: US 8,893,841 B2
(45) Date of Patent: Nov. 25, 2014

(54) SYSTEMS AND METHODS FOR INTEGRATING WORK VEHICLE AND SERVICE PACK COOLING SYSTEMS

(75) Inventor: Benjamin Gene Peotter, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 285 days.

(21) Appl. No.: 13/296,170

(22) Filed: Nov. 14, 2011

(65) Prior Publication Data

US 2013/0118821 A1 May 16, 2013

(51) Int. Cl.
*B60H 1/00* (2006.01)
*F02B 73/00* (2006.01)
*F01P 9/00* (2006.01)
*F02D 25/04* (2006.01)

(52) U.S. Cl.
CPC ................ *F02B 73/00* (2013.01); *F02D 25/04* (2013.01); *F01P 2060/08* (2013.01); *F01P 9/00* (2013.01)
USPC ..................... 180/69.6; 62/236; 123/142.5 R; 165/41

(58) Field of Classification Search
USPC ........... 180/53.1, 53.4, 69.6, 53.8, 68.1, 68.4; 165/41, 42, 43, 44; 237/12.3 R, 5, 12.4, 237/28; 701/50; 123/142.5 R; 60/714, 708
See application file for complete search history.

(56) References Cited

U.S. PATENT DOCUMENTS 4,133,284 A 1/1979 Holcroft
4,424,775 A * 1/1984 Mayfield et al. ....... 123/142.5 R
4,448,157 A * 5/1984 Eckstein et al. ....... 123/142.5 R
4,520,767 A * 6/1985 Roettgen et al. ............. 123/41.1
4,531,379 A 7/1985 Diefenthaler, Jr.
4,611,466 A 9/1986 Keedy
4,756,359 A * 7/1988 Greer .............................. 165/43
4,762,170 A 8/1988 Nijjar et al.
RE33,687 E * 9/1991 Greer .............................. 165/43
5,177,978 A * 1/1993 Brown ............................ 62/236
5,333,678 A * 8/1994 Mellum et al. .................. 165/42
5,528,901 A * 6/1996 Willis ............................. 60/626
5,908,069 A * 6/1999 Baldwin et al. ................. 165/41
6,543,240 B2 * 4/2003 Grafton ........................... 62/214
6,945,207 B2 * 9/2005 Biess et al. ............. 123/142.5 R
7,150,159 B1 * 12/2006 Brummett et al. .............. 62/236
7,870,915 B2 1/2011 Beeson et al.
7,939,952 B2 * 5/2011 Borghi .......................... 290/1 A
2003/0070849 A1 * 4/2003 Whittaker .................... 180/68.2
2004/0187505 A1 * 9/2004 Hoff et al. ....................... 62/236
2005/0045631 A1 3/2005 Dunkle

OTHER PUBLICATIONS

PCT International Search Report for PCT Application No. PCT/US2012/064814 mailed Jun. 12, 2013, 16 pgs.

* cited by examiner

*Primary Examiner* — Katy M Ebner
*Assistant Examiner* — Emma K Frick
(74) *Attorney, Agent, or Firm* — Fletcher Yoder P.C.

(57) ABSTRACT

A work vehicle with a vehicle cooling system that cools a vehicle engine. The work vehicle also includes a service pack cooling system configured to cool a service pack engine of a service pack. The work vehicle includes valving fluidly coupling the vehicle cooling system to the service pack cooling system. The valving is configured to allow independent or integrated operation of the vehicle cooling system and the service pack cooling system. The valving is also configured to permit the vehicle cooling system and the service pack cooling system to operate at different pressures.

15 Claims, 3 Drawing Sheets

SYSTEMS AND METHODS FOR INTEGRATING WORK VEHICLE AND SERVICE PACK COOLING SYSTEMS

BACKGROUND

The invention relates generally to vehicle cooling systems and, more particularly, to systems and methods for integrating work vehicle and service pack cooling systems.

A wide range of work vehicles have been developed and are presently in service. Depending upon their intended use, the work vehicles may include service packs for performing work operations, such as welding, cutting, assembly, pneumatic, hydraulic, and so forth, and for providing AC and/or DC power. As may be appreciated, the work vehicle and the service pack may include separate engines with separate cooling systems. In certain work vehicles, the cooling system of the work vehicle may be integrated with the cooling system of the service pack. However, cooling systems in work vehicles may operate at higher pressures than cooling systems in service packs. Further, the cooling system of the service packs may not be manufactured to operate using the higher pressures used in the work vehicle cooling systems. Accordingly, there exits a need for systems and methods that allow vehicle cooling systems operating at higher fluid pressures to be integrated with service pack cooling systems.

BRIEF DESCRIPTION

In an exemplary embodiment, a work vehicle includes a vehicle engine configured to propel the vehicle. The work vehicle also includes a vehicle cooling system having a vehicle engine cooling section configured to cool the vehicle engine and an auxiliary section configured to heat or cool the vehicle. The vehicle engine cooling section and the auxiliary section each include an inlet port and an outlet port. The auxiliary section inlet port is fluidly coupled to the vehicle engine cooling section outlet port and the auxiliary section outlet port is fluidly coupled to the vehicle engine cooling section inlet port. The auxiliary section includes a check valve fluidly coupled between the auxiliary section inlet port and the auxiliary section outlet port. The check valve is configured to enable fluid to flow through the auxiliary section from the auxiliary section inlet port to the auxiliary section outlet port, and to inhibit fluid from flowing through the auxiliary section from the auxiliary section outlet port to the auxiliary section inlet port. The work vehicle also having a service pack supported on the vehicle and including a service pack engine operable independently of operation of the vehicle engine. The service pack includes a service pack cooling system having a service pack engine cooling section with an inlet port and an outlet port. The service pack cooling system is configured to cool the service pack engine. The work vehicle includes a cooling system interface having a first interface fluidly coupling the service pack engine cooling section outlet port to the vehicle engine cooling section inlet port to allow fluid to flow from the service pack cooling system to the vehicle cooling system. The cooling system interface also includes a second interface fluidly coupling a first portion of the auxiliary section to the service pack engine cooling section inlet port to enable fluid to flow from the vehicle cooling system to the service pack cooling system. The first portion of the auxiliary section includes a conduit coupling the auxiliary section inlet port to the check valve. The second interface includes a regulating device configured to regulate the pressure of fluid flowing from the vehicle cooling system to the service pack cooling system and to permit the vehicle cooling system and the service pack cooling system to operate at different pressures.

In another embodiment, a work vehicle includes a vehicle cooling system configured to cool a vehicle engine. The work vehicle also includes a service pack cooling system configured to cool a service pack engine of a service pack. The work vehicle includes valving fluidly coupling the vehicle cooling system to the service pack cooling system. The valving is configured to allow independent or integrated operation of the vehicle cooling system and the service pack cooling system. The valving is also configured to permit the vehicle cooling system and the service pack cooling system to operate at different pressures.

In another embodiment, a method for integrating a vehicle cooling system of a work vehicle and a service pack cooling system of a service pack includes coupling a check valve to a heater section of the vehicle cooling system to direct fluid to flow in one direction through the heater section, from a heater section inlet to a heater section outlet. The heater section includes a first heater portion between the heater section inlet and the check valve. The method also includes coupling a first fluid interface between the first heater portion and a service pack cooling system inlet port of the service pack cooling system to enable fluid to flow from the vehicle cooling system to the service pack cooling system. The first fluid interface includes a pressure regulator configured to regulate the pressure of fluid flowing from the vehicle cooling system to the service pack cooling system. The method includes coupling a second fluid interface between a service pack cooling system outlet port of the service pack cooling system and a vehicle cooling system inlet port of the vehicle cooling system to enable fluid to flow from the service pack cooling system to the vehicle cooling system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
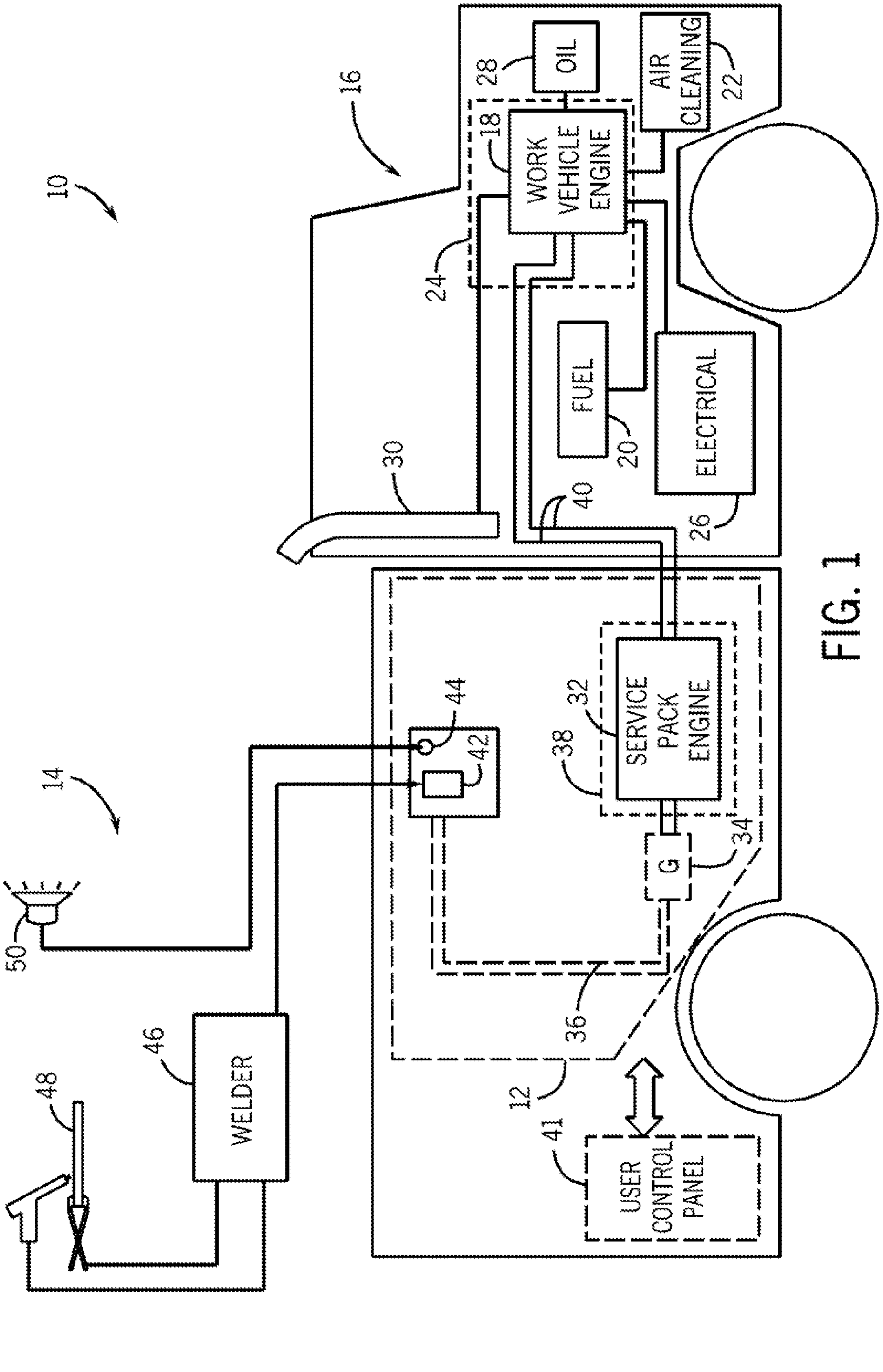
FIG. 1 is a diagrammatical overview of a work vehicle in which cooling systems of the vehicle and a service pack are integrated in accordance with aspects of the present invention.

Turning now to the drawings, and referring first to FIG. 1, a work vehicle 10 is illustrated including cooling systems of the vehicle 10 and a service pack 12 that are integrated in accordance with the invention. The work vehicle 10 is shown as a work truck, although any suitable configuration for the vehicle may be envisaged. In the illustrated embodiment, the vehicle 10 includes the service pack 12 for supplying power to a range of applications 14. The vehicle 10 has a vehicle power plant 16 based around a vehicle engine 18. Although the invention is not limited to any particular configuration or equipment, work vehicle engines of this type will typically be diesel engines, although gasoline engines may be used in some vehicles.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. Further, a cooling system 24, which will typically include an engine cooling loop (e.g., passages through the cylinder block, head, etc.), a radiator, a circulation pump, an expansion tank, a thermostat-controlled valve and a fan, provides fluid for cooling the engine. An electrical system 26 will include an alternator or generator, along with one or more system batteries, cabling for these systems, cable assemblies routing power to a fuse box or other distribution system, and so forth. In addition, a lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include exhaust gas after treatment, mufflers, and associated conduits.

The service pack 12 may include one or more service systems driven by a service engine 32. In a present embodiment, the service pack 12 provides electrical power for the applications 14. In certain embodiments, the service pack 12 may provide compressed air, hydraulic pressure, AC power, DC power, and so forth for various applications 14. In the diagrammatical representation of FIG. 1, for example, the service engine 32 drives a generator 34. The engine 32 may be of any desired type, but in a present embodiment a diesel engine is contemplated. Certain embodiments may use gasoline or other engines. The generator 34 may be directly driven by the engine 32, such as by close coupling the generator 34 to the engine 32, or may be belt or chain driven, where desired. Presently contemplated generators include three-phase brushless types, capable of producing power for a range of applications. However, other generators may be employed, including single-phase generators and generators capable of producing multiple power outputs.

The systems of the service pack 12 will include appropriate conduits, wiring, tubing and so forth for conveying the service generated by these components to an access point. Convenient access points may be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical wiring and circuitry 36 for providing AC and/or DC power to the applications 14. As will be appreciated by those skilled in the art, the wiring and circuitry 36 will typically include protective circuits for the electrical power, including fuses, circuit breakers, and so forth. For the supply of electrical power, certain types of power may be conditioned (e.g., smoothed, filtered, etc.), and DC power output may be provided by rectification, filtering and regulating of AC power.

As illustrated, the service pack 12 includes a cooling system 38 that provides fluid to cool the engine 32. As will be described in more detail below, the cooling system 38 may include an engine cooling loop (e.g., passages through the cylinder block, head, etc.), a radiator, a circulation pump, a thermostat-controlled valve, an expansion tank, and a fan, among other things. Further, the cooling system 38 of the service pack 12 is coupled to the cooling system 24 of the work vehicle 10 using a cooling system interface 40. As may be appreciated, the cooling system interface 40 may include any suitable devices for connecting the cooling systems 24 and 38 together. For example, the cooling system interface 40 may include conduits, valves, regulators, and so forth.

As will be appreciated, by integrating the cooling systems 24 and 38, fluid may flow between the systems 24 and 38 when either engine 18 or 32 are operating, or while both engines 18 and-32 are operating. As such, heated or cooled fluid may be exchanged by the systems 24 and 38 and used for heating and/or cooling various portions of the work vehicle 10. For example, if the vehicle engine 18 is operating and the service pack engine 32 is not operating, fluid from the cooling system 24 may be heated by the vehicle engine 18 and flow to the service pack cooling system 38. The service pack cooling system 38 may use the heated fluid to heat the service pack engine 32 so it is ready to start when desired (e.g., such as for starting the engine 32 during cold weather). As another example, if the service pack engine 32 is operating and the vehicle engine 18 is not operating, fluid from the cooling system 38 may be heated by the service pack engine 32 and flow to the vehicle cooling system 24. The vehicle cooling system 24 may use the heated fluid to heat the vehicle engine 18 so it is ready to start when desired (e.g., such as for starting the engine 18 during cold weather).

In a presently contemplated embodiment, certain control functions may be available from a user control and service panel 41. The service panel, as noted above, may be located on any surface of the vehicle, or on multiple locations in the vehicle, and may be covered by doors or other protective structures, where desired. There is no requirement, generally, that the service panel 41 be located at the same location, or even near the locations of access to the electrical output points of the service pack 12. In a presently contemplated embodiment, the panel is provided in a rear compartment covered by an access door. The control and service panel 41 may permit, for example, starting and stopping of the service engine 32 by a keyed ignition or starter button. Other controls for the engine 32 may also be provided on the control and service panel 41. The control and service panel 41 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service pack engine 32, such as during transport. As noted above, any desired location may be selected as a convenient access point for one or more of the systems of the service pack 12. In the illustrated embodiment, for example, one or more alternating current electrical outputs, which may take the form of electrical receptacles 42 (e.g., for AC power) and 44 (e.g., for DC power) are provided.

In the embodiment illustrated in FIG. 1, the applications 14 may be coupled to the service pack 12 by interfacing with the outputs provided by receptacle 42. For example, a portable welder 46 may be coupled to the AC electrical output 42, and may provide constant current or constant voltage-regulated power suitable for a welding application. As will be appreciated by those skilled in the art, the welder 46 may receive power from the electrical output of the generator 34, and contain circuitry designed to provide for appropriate regulation of the output power provided to cables suitable for a welding application 48. The presently contemplated embodiments include welders, plasma cutters, and so forth, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired. Similarly, DC loads may be coupled to the DC receptacle 44. Such loads may include lights 50, or any other loads that would otherwise be powered by operation of the vehicle engine 18.

In use, the service pack 12 will provide power for the on-site applications separately from the vehicle engine 18. That is, the service engine 32 generally may not be powered during transit of the vehicle 10 from one service location to another, or from a service garage or facility to a service site. Once located at the service site, the vehicle 10 may be parked at a convenient location, and the vehicle engine 18 may be shut down. The service engine 32 may then be powered, to provide service from one or more of the service systems described above. Moreover, as in conventional vehicles, where stabilization of the vehicle or any of the systems is require, the vehicle may include outriggers, stabilizers (not shown), and so forth which may be deployed after parking the vehicle and prior to operation of the service pack 12.

Figure 2:
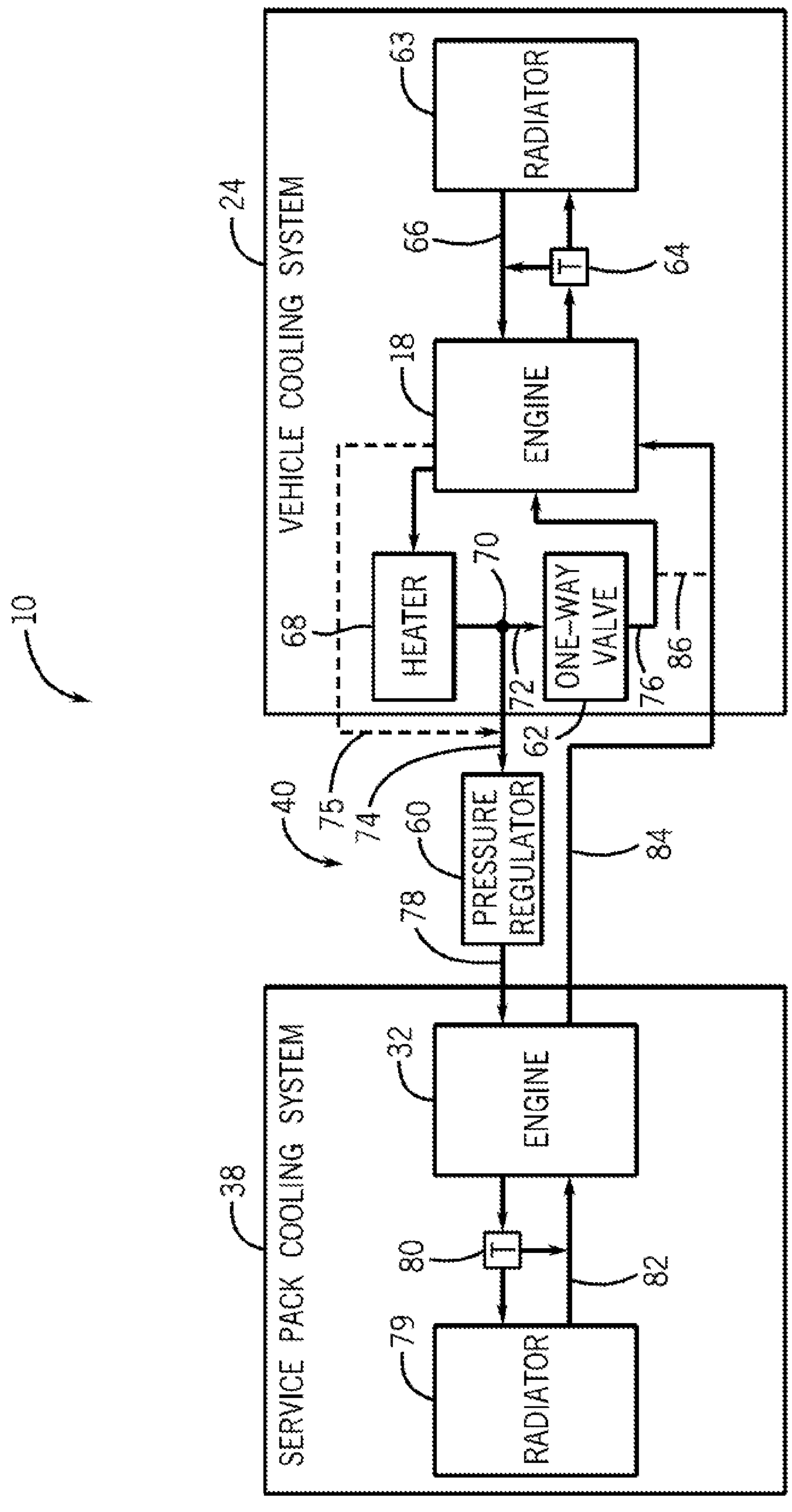
FIG. 2 illustrates a block diagram of an embodiment of a work vehicle with integrated vehicle and service pack cooling systems.

FIG. 2 illustrates a block diagram of an embodiment of the work vehicle 10 with integrated vehicle and service pack cooling systems 24 and 38. As previously described, the cooling system interface 40 fluidly couples the vehicle cooling system 24 to the service pack cooling system 38. Specifically, the cooling system interface 40 includes a pressure regulator 60 (or other regulating device) and various other connections, conduits, sections, etc. The pressure regulator 60 may be any suitable device for regulating the pressure of fluid flowing from the work vehicle power plant 16 to the service pack 12. As such, the pressure regulator 60 limits the pressure of the fluid flowing from the vehicle cooling system 24 to the service pack cooling system 38. For example, the pressure regulator 60 may limit the pressure of fluid flowing to the service pack cooking system 38 to a pressure less than approximately 12 PSI. Therefore, in such a configuration, if the pressure from the vehicle cooling system 24 is greater than approximately 12 PSI, the pressure regulator 60 will limit the pressure of the fluid flowing to the service pack cooling system 38 to a maximum of 12 PSI. On the other hand, in this example, if the pressure from the vehicle cooling system 24 is less than approximately 12 PSI, the pressure regulator 60 will not limit the pressure of fluid flowing to the service pack cooling system 38. In certain embodiments, a fixed restriction may be used instead of the pressure regulator 60 to restrict the flow of fluid to the service pack cooling system 38 and to limit the pressure of fluid flowing to the service pack cooling system 38.

A one-way valve or check valve 62 is also included to connect the cooling system 24 of the work vehicle 10 to the cooling system 38 of the service pack 12. The one-way valve 62 may be any suitable one-way valve, such as a ball check valve, for example. As will be appreciated, the one-way valve 62 allows or enables fluid to flow through the valve 62 in one direction and blocks or inhibits fluid from flowing through the valve 62 in the opposite direction, as will be discussed in greater detail below.

During operation, a fluid or coolant (e.g., water, antifreeze, etc.) flows through the vehicle 10 as follows. The fluid flows within the vehicle cooling system 24 through the engine 18 where the fluid circulates to exchange heat with the engine 18. For example, if the fluid temperature is a greater temperature than the engine 18, the fluid transfers heat to the engine 18. Conversely, if the engine 18 temperature is a greater temperature than the fluid, the engine 18 transfers heat to the fluid. The fluid may flow from the engine 18 to a radiator 63 to be cooled. A thermostat 64 controls the flow of fluid to the radiator 63 as will be discussed in greater detail below, in relation to FIG. 3. The fluid may return from the radiator 63 to the engine 18 through a conduit 66. The fluid may exit the engine 18 and flow through a heater 68 used to provide heat, such as to a cab of the vehicle 10. In certain embodiments, an auxiliary loop such as a cooler may be used in place of the heater 68.

The fluid flows through the heater 68 to a junction 70 where the fluid may flow through a conduit 72 to the one-way valve 62 to return to the engine 18 or the fluid may flow through a conduit 74 to the pressure regulator 60 to flow to the service pack cooling system 38. If the fluid flows through the conduit 72, the fluid next flows through the one-way valve 62 and through a conduit 76 which directs the fluid to the vehicle cooling system 24. As may be appreciated, the one-way valve 62 inhibits fluid from flowing in the opposite direction (i.e., from the conduit 76 and through the one-way valve 62 to the conduit 72).

Returning to the junction 70, the fluid may also flow through the conduit 74 to the pressure regulator 60. In certain embodiments, a conduit 75 may be used to bypass the heater 68 so that fluid may flow directly from the engine 18 to the pressure regulator 60. As previously mentioned, the pressure regulator 60 limits the pressure of fluid flowing to the service pack cooling system 38. Regulated fluid exits the pressure regulator 60 and flows through a conduit 78 to the service pack cooling system 38. The fluid flows through the service pack engine 32 where the fluid circulates to exchange heat with the engine 32. For example, if the fluid temperature is a greater temperature than the engine 32, the fluid transfers heat to the engine 32. Conversely, if the engine 32 temperature is a greater temperature than the fluid, the engine 32 transfers heat to the fluid. The fluid may flow from the engine 32 to a radiator 79 to be cooled. A thermostat 80 controls the flow of fluid to the radiator 79 as will be discussed in greater detail below, in relation to FIG. 3. The fluid may return from the radiator 79 to the engine 32 through a conduit 82. The fluid may exit the engine 32 and the service pack cooling system 38 through a conduit 84. From the conduit 84, the fluid returns to the vehicle cooling system 24 and flows to the engine 18. As may be appreciated, in certain embodiments, the conduits 76 and 84 may be connected together and/or may be coupled to the engine 18 at a single location, as illustrated by a conduit 86.

As described, the vehicle cooling system 24 is integrated with the service pack cooling system 38. The cooling systems 24 and 38 are integrated so that a high fluid pressure from the vehicle cooling system 24 will be regulated and result in limited fluid pressure entering the service pack cooling system 38. For example, the vehicle cooling system 24 may operate with a maximum fluid pressure of approximately 25 to 38 PSI, while the service pack cooling system 38 may operate with a maximum fluid pressure of approximately 12 to 18 PSI. By integrating such cooling system 24 and 38, the pressure regulator 60 regulates the pressure of fluid flowing to the service pack cooling system 38 to a maximum of approximately 12 to 18 PSI. As may be appreciated, in certain embodiments the maximum pressure of fluid flowing to the service pack cooling system 38 may be no greater than the setting of the pressure regulator 60 and/or the expansion tank or radiator cap pressure settings. As previously discussed, reverse flow of fluid from the vehicle cooling system 24 is inhibited by the one-way valve 62 so that fluid does not flow from the conduit 76 to the conduit 72 and bypass the vehicle engine cooling loop (e.g., passages through the engine cylinder block, head, etc.). As such, even though the vehicle cooling system 24 and the service pack cooling system 38 are not designed to operate with equivalent fluid pressures, the cooling systems 24 and 38 may operate collectively by integrating the cooling systems 24 and 38 as described.

Figure 3:
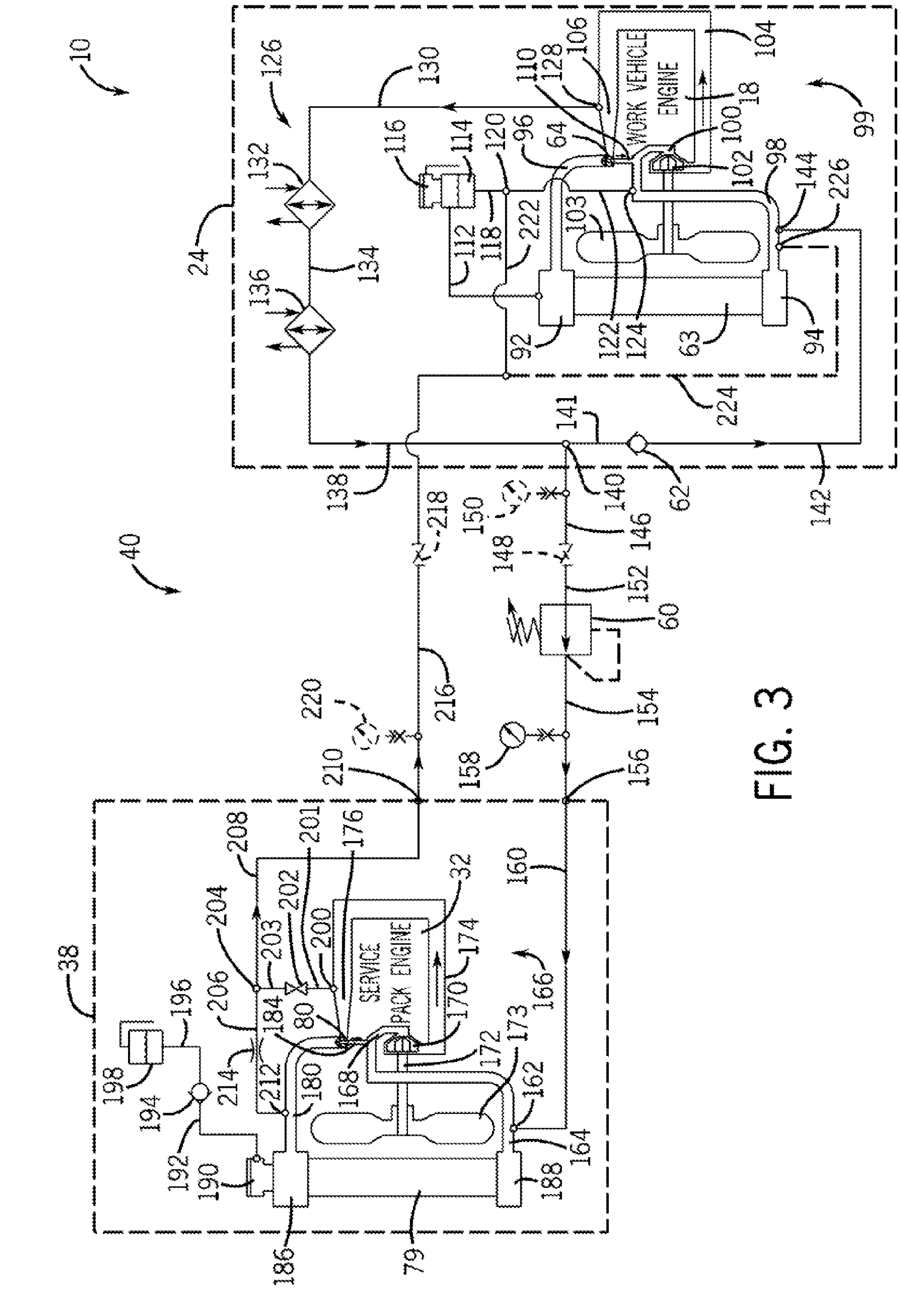
FIG. 3 illustrates a schematic diagram of an embodiment of a work vehicle with integrated vehicle and service pack cooling systems.

FIG. 3 illustrates a schematic diagram of an embodiment of the work vehicle 10 with integrated vehicle and service pack cooling systems 24 and 38. As illustrated, FIG. 3 provides additional features and details that relate to the embodiment described in FIG. 2. The vehicle cooling system 24 includes the radiator 63 with an inlet port 92 and an outlet port 94. The radiator 63 is used to cool fluid flowing through the system 24. A radiator inlet conduit 96 is coupled to the radiator inlet port 92 to direct fluid into the radiator 63. Further, an engine water pump inlet 98 is coupled to the radiator outlet port 94 to direct fluid out of the radiator 63. The engine water pump inlet 98 directs fluid to a vehicle engine cooling section 99 which may be used to cool or heat the vehicle engine 18.

The vehicle engine cooling section 99 includes an engine cooling section inlet port 100 which directs fluid to a pump 102 (e.g., water pump). The pump 102, when operating, causes fluid to be pumped through the cooling system 24 and causes a fan 103 to rotate. As may be appreciated, the fan 103 rotates and directs air across the radiator 63 to aid in cooling the fluid flowing through the radiator 63. The pump 102 directs fluid through a vehicle engine loop 104 where the fluid either has a cooling effect on the vehicle engine 18 or the fluid transfers heat to the vehicle engine 18, depending on the temperature of the engine 18 and the temperature of the fluid. Fluid flows from the vehicle engine loop 104 to an engine cooling section outlet port 106 where the fluid may exit the vehicle engine loop 104 via multiple paths.

The vehicle engine thermostat 64 controls whether fluid flows into the radiator inlet conduit 96. If the temperature of the fluid surpasses a minimum temperature threshold, the vehicle engine thermostat 64 will open and allow fluid to flow into the radiator inlet conduit 96 where the fluid is directed to the radiator 63 to be cooled. Conversely, if the temperature of the fluid is lower than the minimum temperature threshold, the vehicle engine thermostat 64 will remain closed and block fluid from flowing into the radiator inlet conduit 96. As illustrated, a conduit 110 may allow a portion of the fluid to flow from the engine cooling section outlet port 106 to the engine cooling section inlet port 100.

Excess fluid present during operation of the vehicle cooling system 24 may flow through the conduit 112 to the expansion tank 114. The expansion tank 114 includes a cap 116 which is designed to release pressure from the vehicle cooling system 24 if pressure within the system 24 rises above a pressure threshold. For example, the cap 116 may designed to release system pressure if the system 24 pressure exceeds a pressure threshold of approximately 16 PSI. Fluid may also flow from the expansion tank 114 through a conduit 118 to flow toward the engine cooling section inlet port 100. Specifically, the fluid may flow thorough the conduit 118 to a junction 120 (e.g., a T junction) where the fluid is directed to a conduit 122 and to the engine cooling section inlet port 100 where the fluid may be pumped through the vehicle engine loop 104 as previously described.

Returning to the engine cooling section outlet port 106, fluid may flow from the engine cooling section outlet port 106 to an auxiliary section 126 (e.g., heater section, cooling section, etc.) of the vehicle cooling system 24. The auxiliary section 126 may provide heating or cooling to the vehicle 10, such as by heating or cooling the air provided to the vehicle cab. The fluid enters the auxiliary section 126 through an auxiliary section inlet port 128 (e.g., heater section inlet port, cooling section inlet port, etc.) which directs fluid into a conduit 130. The fluid may flow from the conduit 130 and through a heat exchanger 132 where the air provided to the vehicle cab is heated or cooled. The fluid then flows through a conduit 134 which directs the fluid, in some embodiments, to an optional heat exchanger 136 where again heat is transferred from the fluid to heat air or heat is transferred from air to the fluid to cool air. The fluid exits the optional heat exchanger 136 and flows through a conduit 138. The conduit 138 directs the fluid to a junction 140 (e.g., a T junction) where a portion of the fluid may flow through a conduit 141, through the one-way valve 62 to a conduit 142, and exit the auxiliary section 126 through an auxiliary section outlet port 144 (e.g., heater section outlet port, cooling section outlet port, etc.) which is fluidly coupled to the engine water pump inlet 98.

From the junction 140, a portion of the fluid may flow through a conduit 146. In certain embodiments, the conduit 146 may be fluidly coupled to an isolation valve 148 that is used to enable or inhibit the flow of fluid from the vehicle cooling system 24 to the service pack cooling system 38. Further, in some embodiments, a pressure gauge 150 is coupled to the conduit 146 to measure the pressure of the fluid flowing from the vehicle cooling system 24 toward the pressure regulator 60. The fluid may flow from the isolation valve 148 through a conduit 152 to the pressure regulator 60 which regulates the pressure of the fluid that flows to the service pack cooling system 38. Regulated fluid flows from the pressure regulator 60 and through a conduit 154 to a service pack inlet port 156 which directs fluid into the service pack 12. A pressure gauge 158 is coupled to the conduit 154 to measure the pressure of the fluid flowing from the pressure regulator 60 toward the service pack cooling system 38.

The fluid enters the service pack 12 through the service pack inlet port 156 and flows through a conduit 160 to a junction 162 which couples the conduit 160 to a engine water pump inlet 164 of the service pack cooling system 38. The fluid is directed from the engine water pump inlet 164 toward a service pack engine cooling section 166. The service pack engine cooling section 166 may be used to cool or heat the service pack engine 32. Specifically, the engine water pump inlet 164 directs fluid to an engine cooling section inlet port 168 of the service pack engine cooling section 166. The engine cooling section inlet port 168 then directs fluid to a pump 170 (e.g., water pump). When the service pack 12 is running, the pump 170 aids fluid to be pumped through the cooling system 38 and rotates a shaft 172 which causes a fan 173 to rotate. In certain embodiments, the pump 170 may be a dynamic or centrifugal pump. Therefore, fluid may flow through the pump 170 even if the pump is not operating. The pump 170 directs fluid through a service pack engine loop 174 of the service pack cooling section 166 where the fluid either has a cooling effect on the service pack engine 32 or the fluid transfers heat to the service pack engine 32, depending on the temperature of the engine 32 and the temperature of the fluid. The fluid flows from the service pack engine loop 174 to an engine cooling section outlet port 176 where the fluid may exit the service pack engine loop 174 via multiple paths.

The service pack engine thermostat 80 controls whether fluid flows from the engine cooling section outlet port 176 into a radiator inlet conduit 180. If the temperature of the fluid surpasses a minimum temperature threshold, the service pack engine thermostat 80 will open and allow fluid to flow into the radiator inlet conduit 180 where the fluid is directed to the radiator 79 to be cooled. Conversely, if the temperature of the fluid is lower than the minimum temperature threshold, the service pack engine thermostat 80 will remain closed and block fluid from flowing into the radiator inlet conduit 180. As illustrated, a conduit 184 may allow a portion of the fluid to flow from the engine cooling section outlet port 176 to the engine cooling section inlet port 168.

The service pack cooling system 38 includes the radiator 79 which has an inlet port 186 and an outlet port 188. The radiator 79 is used to cool fluid flowing through the service pack cooling system 38. Specifically, fluid flows into the radiator 79 through the radiator inlet conduit 180 which is coupled to the radiator inlet port 186. Further, the engine water pump inlet 164 is coupled to the radiator outlet port 188 to direct fluid out of the radiator 79 and toward the service pack engine cooling section 166. As may be appreciated, as the fan 173 rotates, air is directed across the radiator 79 to aid in cooling the fluid flowing through the radiator 79.

A radiator cap 190 is coupled to the radiator 79 and allows the system 38 to vent if pressure within the system 38 exceeds a pressure threshold. For example, the radiator cap 190 may be configured to allow fluid to exit the system 38 if the fluid pressure exceeds approximately 18 PSI. It should be noted that the combined cooling systems 24 and 38 are configured so that the cap 116 of the vehicle cooling system 24 is set to a lower pressure threshold than the radiator cap 190 of the service pack cooling system 38. Thus, the vehicle 10 is configured so that excess fluid will generally exit through the cap 116 of the vehicle cooling system 24. However, the radiator cap 190 provides a venting option for conditions where the combined systems 24 and 38 are not operating properly together. When fluid is vented through the radiator cap 190, the fluid flows through a conduit 192, through a one-way valve or check valve 194, and through a conduit 196 to an expansion tank 198. As may be appreciated, the check valve 194 inhibits fluid (e.g., liquid and/or air) flow from the expansion tank 198 into the cooling system 38 so that fluid and venting may only be introduced into the cooling systems 24 and 38 from the expansion tank 114. In certain embodiments, the conduit 192 may be coupled to the expansion tank 114 of the vehicle cooling system 24 instead of the expansion tank 198, thereby eliminating the need for the radiator cap 190, the check valve 194, the conduit 196, and the expansion tank 198.

Returning to the engine cooling section outlet port 176 of the service pack cooling section 166, fluid may exit from the outlet port 176 via a junction 200 and flow through a conduit 201 toward a valve 202. When closed, the valve 202 inhibits fluid from flowing toward a conduit 203, thus limiting the amount of fluid that flows from the service pack cooling system 38 to the vehicle cooling system 24. Conversely, when opened, the valve 202 allows fluid to flow through the conduit 203 to a junction 204 (e.g., a T junction) where fluid from the conduit 203 and a conduit 206 are combined and directed toward a conduit 208. The conduit 208 directs fluid to exit the service pack 12 through a service pack outlet port 210. The fluid may flow into the conduit 206 by exiting the radiator inlet conduit 180 through a junction 212 and flowing through a constricted portion 214 (e.g., restriction, or restrictive conduit) of the conduit 206. Thus, the conduit 206 allows fluid (e.g., liquid and/or air) to be vented from the cooling system 38 and directed toward the expansion tank 114 of the vehicle cooling system 24.

When the fluid exits the service pack 12 through the outlet port 210, the fluid flows through a conduit 216 which may direct the fluid through an isolation valve 218. The isolation valve 218 may be used to allow or block fluid flow from the service pack cooling system 38 to the vehicle cooling system 24. Thus, using the optional isolation valves 218 and 148, the cooling systems 24 and 38 may be isolated from each other. A pressure gauge 220 may be coupled to the conduit 216 to measure the pressure of fluid flowing from the service pack cooling system 38 to the vehicle cooling system 24. Further, a conduit 222 couples the isolation valve 218 to the junction 120 where the fluid is generally directed through the conduit 122 toward the engine cooling section inlet port 100. In certain embodiments, the fluid may be directed from the service pack cooling system 38 into the vehicle cooling system 24 by a conduit 224 which is coupled to the engine water pump inlet 98 via a junction 226.

It should be noted that the valves 148, 202, and 218 are in the open position during normal operating conditions. However, to operate the cooling systems 24 and 38 in isolated modes, the valves 148, 202, and 218 are placed in the closed position. Further, as previously described, the pressure gauges 150, 158, and 220 are used to measure the pressures of the integrated systems 24 and 38, but they may also be used to troubleshoot operation of the integrated systems 24 and 38. For example, the pressure gauge 158 may be used to verify that the pressure regulator 60 is operating properly. In addition, the pressure gauges 150 and 220 may be used to pinpoint locations within the cooling systems 24 and 38 that are not operating properly.

In certain embodiments, the service pack 12 may be manufactured with the components and conduits as illustrated, with the inlet port 156 and the outlet port 210 for fluidly coupling the service pack cooling system 38 to the vehicle cooling system 24. In other embodiments, the service pack 12 may be modified from its manufactured arrangement to include the components and conduits as illustrated. For example, to modify the service pack 12, the one-way valve 194 may be coupled between the conduits 192 and 196. The original radiator cap on the radiator 79 may be replaced with the radiator cap 190, which is rated with a higher PSI (e.g., an original radiator cap rated to vent fluid at approximately 12 PSI may be replaced with the radiator cap 190 rated to vent fluid at approximately 16 PSI). The inlet port 156 may be attached to an outer case of the service pack 12, and the junction 162 may be coupled to the engine water pump inlet 164. Further, the conduit 160 may be fluidly coupled between the inlet port 156 and the junction 162. The outlet port 210 may be attached to the outer case of the service pack 12. In addition, the junction 200 may be coupled to the engine cooling section outlet port 176 and the junction 212 may be coupled to the radiator inlet conduit 180. The conduit 206 may be coupled between the junctions 212 and 204. Further, the conduit 208 may be coupled between the junction 204 and the outlet port 210. The conduit 201 may be coupled between the junction 200 and the valve 202 and the conduit 203 may be coupled between the valve 202 and the junction 204. Thus, the service pack 12 may be modified to interface with the vehicle cooling system 24.

In addition, the vehicle power plant 16 may be modified from its manufactured arrangement to interface with the service pack 12. Specifically, the auxiliary section 126 may be modified to insert the junction 140, the conduit 141, and the one-way valve 62 between the existing conduits 138 and 142. For example, the conduits 138 and 142 may be originally be one continuous conduit that is cut or severed to insert the junction 140, the conduit 141, and the one-way valve 62. In particular, the junction 140 may be coupled to the conduit 138 and the one-way valve 62 may be coupled to the conduit 142. The conduit 141 may couple the junction 140 and the one-way valve 62 together.

The junction 140 is used to fluidly couple the vehicle cooling system 24 to the service pack 12. As illustrated, the conduit 146 is coupled to the junction 140 and the conduit 152 is coupled to the pressure regulator 60. In certain embodiments, the conduits 152 and 146 comprise a single continuous conduit. In other embodiments, the valve 148 is coupled between the conduits 146 and 152. Further, certain embodiments include the pressure gauge 150 coupled to the conduit 146. The conduit 154 is inserted to couple the pressure regulator 60 to the inlet port 156. In addition, the pressure gauge 158 is coupled to the conduit 154. Thus, output from the vehicle cooling system 24 is fluidly coupled to the input of the service pack 12.

The vehicle power plant 16 may also be modified to receive fluid from the service pack 12. In some embodiments, the conduits 118 and 122 are a single continuous conduit in the vehicle 16. The conduits 118 and 122 are cut and the junction 120 is inserted between the conduits 118 and 122. The conduit 122 is fluidly coupled to the junction 120 for fluid to flow into the vehicle cooling system 24. However, in certain configurations, it may be difficult to cut conduits 118 and 122 and insert the junction 120 (e.g., conduits 118 and 122 may be steel conduits). In such configurations, the junction 226 may be coupled to the engine water pump inlet 98 and the conduit 224 may be fluidly coupled to the junction 226 for fluid to flow into the vehicle cooling system 24. Further, the conduit 216 is fluidly coupled to the service pack 12, via the outlet port 210. In certain embodiments, the conduits 216 and 222 may form a continuous conduit between the outlet port 210 and the junction 120 or, in other embodiments, the conduits 216 and 224 may form a continuous conduit between the outlet port 210 and the junction 226. However, in some embodiments, the valve 218 may be coupled between either the conduits 216 and 222 or the conduits 216 and 224. Further, the pressure gauge 220 may be coupled to the conduit 216. Thus, the vehicle cooling system 24 of the vehicle power plant 16 may be modified to interface with the service pack cooling system 38.

As may be appreciated, during operation the vehicle 10 may be in one of four separate operating conditions. First, the vehicle 10 operating condition may include the vehicle engine 18 being off and the service pack engine 32 being off. Second, the vehicle engine 18 may be on and the service pack engine 32 may be off. Third, the vehicle engine 18 may be off and the service pack engine 32 may be on. Fourth, the vehicle engine 18 may be on and the service pack engine 32 may be on. First, the vehicle engine 18 may be off and the service pack engine 32 may be off. In such an operating condition, the pumps 102 and 170 are not operating; therefore, fluid is not flowing through the cooling systems 24 and 38.

In the second operating condition, the vehicle engine 18 is on and the service pack engine 32 is off. In this condition, the pump 102 pumps fluid through the integrated cooling systems 24 and 38. Further, the engine 18 is operating and, therefore, fluid flowing through the vehicle engine loop 104 may be heated by the engine 18. The heated fluid flows from the vehicle cooling system 24 to the service pack cooling system 38 where the heated fluid flows through the service pack engine loop 174. The heated fluid transfers heat to the service pack engine 32 if the engine 32 temperature is cooler than the heated fluid. Thus, on cold days, while an operator is driving the vehicle 10 to a work location, the operating engine 18 provides heat to the non-operating engine 32. As such, the non-operating engine 32 may be warm enough to start when desired. As may be appreciated, the radiators 63 and 79 may cool the heated fluid if the heated fluid exceeds the temperature thresholds of thermostats 64 and/or 80, respectively.

In the third operating condition, the vehicle engine 18 is off and the service pack engine 32 is on. In this condition, the pump 170 pumps fluid through the integrated cooling systems 24 and 38. Further, the engine 32 is operating and, therefore, fluid flowing through the service pack engine loop 174 may be heated by the engine 32. The heated fluid flows from the service pack cooling system 38 to the vehicle cooling system 24 where the heated fluid flows through the vehicle engine loop 104. It should be noted that the one-way valve 62 blocks fluid from bypassing the vehicle engine loop 104, which is particularly important in this third operating condition when the pump 102 is not operating. The heated fluid transfers heat to the vehicle engine 18 if the engine 18 temperature is cooler than the heated fluid. Thus, on cold days, while an operator is performing work using the service pack 12, the operating engine 32 provides heat to the non-operating engine 18. As such, the non-operating engine 18 may be warm enough to start when desired. Further, the heated fluid flows through the auxiliary section 126 and may provide heat to the vehicle cab. As may be appreciated, the radiators 63 and 79 may cool the heated fluid if the heated fluid exceeds the temperature thresholds of thermostats 64 and/or 80, respectively.

In the fourth operating condition, the vehicle engine 18 is on and the service pack engine 32 is also on. In this condition, the pumps 102 and 170 pump fluid though the integrated cooling systems 24 and 38. Further, the engines 18 and 32 are operating and, therefore, fluid flowing through the vehicle engine loop 104 and the service pack engine loop 174 are heated by the engines 18 and 32. As may be appreciated, the radiators 63 and 79 may cool the heated fluid if the heated fluid exceeds the temperature thresholds of thermostats 64 and/or 80, respectively. In each of the four operating conditions, the one-way valve 62 blocks fluid from flowing through the conduit 142 toward the service pack inlet port 156. Further, the pressure regulator 60 ensures that the pressure of fluid flowing to the service pack 12 is less than or equal to a pressure threshold. Thus, the vehicle cooling system 24 may operate at a higher pressure than the service pack cooling system 38 and such operation will not have detrimental effects on the service pack cooling system 38 because the pressure regulator 60 limits the pressure of fluid supplied to the service pack cooling system 38.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A work vehicle comprising:

a vehicle engine configured to propel the vehicle;

a vehicle cooling system having a vehicle engine cooling section configured to cool the vehicle engine and an auxiliary section configured to heat or cool the vehicle, the vehicle engine cooling section and the auxiliary section each comprising an inlet port and an outlet port, the auxiliary section inlet port fluidly coupled to the vehicle engine cooling section outlet port and the auxiliary section outlet port fluidly coupled to the vehicle engine cooling section inlet port, wherein the auxiliary section comprises a check valve fluidly coupled between the auxiliary section inlet port and the auxiliary section outlet port, the check valve being configured to enable fluid to flow through the auxiliary section from the auxiliary section inlet port to the auxiliary section outlet port, and to inhibit fluid from flowing through the auxiliary section from the auxiliary section outlet port to the auxiliary section inlet port;

a service pack supported on the vehicle and including a service pack engine operable independently of operation of the vehicle engine, the service pack including a service pack cooling system having a service pack engine cooling section with an inlet port and an outlet port, the service pack cooling system configured to cool the service pack engine; and a cooling system interface comprising a first interface fluidly coupling the service pack engine cooling section outlet port to the vehicle engine cooling section inlet port to allow fluid to flow from the service pack cooling system to the vehicle cooling system and the cooling system interface comprising a second interface fluidly coupling a first portion of the auxiliary section to the service pack engine cooling section inlet port to enable fluid to flow from the vehicle cooling system to the service pack cooling system, the first portion of the auxiliary section comprising a conduit coupling the auxiliary section inlet port to the check valve;

wherein the second interface comprises a regulating device configured to regulate the pressure of fluid flowing from the vehicle cooling system to the service pack cooling system and to permit the vehicle cooling system and the service pack cooling system to operate at different pressures, and wherein the second interface comprises a first conduit coupled between the first portion of the auxiliary section and an inlet of the regulating device, and a second conduit coupled between an outlet of the regulating device and a service pack cooling system inlet port, wherein the first conduit and the second conduit operate at different pressures.

2. The work vehicle of claim 1, wherein the regulating device comprises a pressure regulator.

3. The work vehicle of claim 1, wherein the regulating device comprises a fixed restriction.

4. The work vehicle of claim 1, wherein the service pack cooling system comprises a restrictive conduit configured to enable fluid to flow or vent from the service pack cooling system to the vehicle cooling system and to limit the flow of fluid from the service pack cooling system to the vehicle cooling system.

5. The work vehicle of claim 1, wherein the service pack cooling system comprises an isolation valve disposed between the service pack engine cooling section outlet port and the vehicle engine cooling section inlet port, the isolation valve configured to limit the flow of fluid from the service pack cooling system to the vehicle cooling system.

6. The work vehicle of claim 1, wherein the vehicle cooling system comprises a first radiator to cool fluid flowing through the vehicle cooling system and the service pack cooling system comprises a second radiator to cool fluid flowing through the service pack cooling system.

7. The work vehicle of claim 6, wherein the service pack cooling system comprises a second check valve between the second radiator and a service pack expansion tank, the second check valve configured to allow fluid to flow from the second radiator to the service pack expansion tank.

8. The work vehicle of claim 1, wherein the service pack cooling system is configured to vent fluid through an expansion tank of the vehicle cooling system.

9. The work vehicle of claim 1, wherein the auxiliary section comprises a heater section.

10. A method for integrating a vehicle cooling system of a work vehicle and a service pack cooling system of a service pack comprising:

coupling a check valve to a heater section of the vehicle cooling system to direct fluid to flow in one direction through the heater section, from a heater section inlet to a heater section outlet, wherein the heater section comprises a first heater portion between the heater section inlet and the check valve;

coupling a first fluid interface between the first heater portion and a service pack cooling system inlet port of the service pack cooling system to enable fluid to flow from the vehicle cooling system to the service pack cooling system, wherein the first fluid interface comprises a pressure regulator configured to regulate the pressure of fluid flowing from the vehicle cooling system to the service pack cooling system; and wherein the first fluid interface comprises a first conduit coupled between an outlet of the vehicle cooling system to an inlet of the pressure regulator and a second conduit coupled between an outlet of the pressure regulator and a service pack cooling system inlet port, wherein the first conduit and the second conduit operate at different pressures;

coupling a second fluid interface between a service pack cooling system outlet port of the service pack cooling system and a vehicle cooling system inlet port of the vehicle cooling system to enable fluid to flow from the service pack cooling system to the vehicle cooling system; and coupling an isolation valve between a service pack engine cooling section outlet port and the service pack cooling system outlet port, the isolation valve configured to limit the flow of fluid from the service pack cooling system to the vehicle cooling system.

11. The method of claim 10, comprising coupling a second check valve between a service pack radiator and a service pack expansion tank, the second check valve configured to allow fluid to flow from the service pack radiator to the service pack expansion tank.

12. The method of claim 10, comprising coupling a restrictive conduit between a service pack radiator inlet conduit and the service pack cooling system outlet port, the restrictive conduit configured to enable fluid to flow from the service pack cooling system to the vehicle cooling system and to limit the flow of fluid from the service pack cooling system to the vehicle cooling system.

13. A method for integrating a vehicle cooling system of a work vehicle and a service pack cooling system of a service pack comprising:

coupling a check valve to a heater section of the vehicle cooling system to direct fluid to flow in one direction through the heater section, from a heater section inlet to a heater section outlet, wherein the heater section comprises a first heater portion between the heater section inlet and the check valve;

coupling a first fluid interface between the first heater portion and a service pack cooling system inlet port of the service pack cooling system to enable fluid to flow from the vehicle pg,27 cooling system to the service pack cooling system, wherein the first fluid interface comprises a pressure regulator configured to regulate the pressure of fluid flowing from the vehicle cooling system to the service pack cooling system, and wherein the first fluid interface comprises a first conduit coupled between an outlet of the vehicle cooling system to an inlet of the pressure regulator and a second conduit coupled between an outlet of the pressure regulator and a service pack cooling system inlet port, wherein the first conduit and the second conduit operate at different pressures;

coupling a second fluid interface between a service pack cooling system outlet port of the service pack cooling system and a vehicle cooling system inlet port of the vehicle cooling system to enable fluid to flow from the service pack cooling system to the vehicle cooling system; and coupling a restrictive conduit between a service pack radiator inlet conduit and the service pack cooling system outlet port, the restrictive conduit configured to enable fluid to flow from the service pack cooling system to the vehicle cooling system and to limit the flow of fluid from the service pack cooling system to the vehicle cooling system.

14. The method of claim 13, comprising coupling an isolation valve between a service pack engine cooling section outlet port and the service pack cooling system outlet port, the isolation valve configured to limit the flow of fluid from the service pack cooling system to the vehicle cooling system.

15. The method of claim 13, comprising coupling a second check valve between a service pack radiator and a service pack expansion tank, the second check valve configured to allow fluid to flow from the service pack radiator to the service pack expansion tank.

* * * * *